United States Patent
Tarverdi et al.

(10) Patent No.: US 8,833,681 B2
(45) Date of Patent: *Sep. 16, 2014

(54) METHOD AND APPARATUS FOR DEFIBRILLATING CELLULOSE FIBERS

(75) Inventors: Karnik Tarverdi, Harrow (GB); Trevor W R Dean, High Wycombe (GB); Robert Bramsteidl, St Agatha (AT); Luca Achilli, London (GB)

(73) Assignee: BASF SE, Ludwigshefen (DE)

( * ) Notice: Subject to any disclaimer, the term of this patent is extended or adjusted under 35 U.S.C. 154(b) by 273 days.

This patent is subject to a terminal disclaimer.

(21) Appl. No.: 13/379,778

(22) PCT Filed: Jun. 23, 2010

(86) PCT No.: PCT/EP2010/058927
§ 371 (c)(1),
(2), (4) Date: Apr. 6, 2012

(87) PCT Pub. No.: WO2010/149711
PCT Pub. Date: Dec. 29, 2010

(65) Prior Publication Data
US 2012/0187226 A1    Jul. 26, 2012

(30) Foreign Application Priority Data

Jun. 24, 2009 (WO) ................ PCT/NL2009/000141

(51) Int. Cl.
| | |
|---|---|
| D21B 1/00 | (2006.01) |
| D21B 1/16 | (2006.01) |
| D21B 1/34 | (2006.01) |
| D21J 1/00 | (2006.01) |
| D21J 3/00 | (2006.01) |
| D21B 1/12 | (2006.01) |
| D21B 1/30 | (2006.01) |
| D21B 1/32 | (2006.01) |
| D21H 11/18 | (2006.01) |
| D21C 9/00 | (2006.01) |

(52) U.S. Cl.
CPC .... D21J 1/00 (2013.01); D21J 3/00 (2013.01); D21B 1/12 (2013.01); D21B 1/30 (2013.01); D21B 1/32 (2013.01); D21C 9/007 (2013.01); D21H 11/18 (2013.01)
USPC .... 241/24.19; 241/21; 241/24.29; 241/260.1; 241/261

(58) Field of Classification Search
CPC ........ B02C 17/20; B02C 17/16; B02C 19/22; B03B 9/061; B07B 9/00; D21B 1/30
USPC ................ 241/21, 24, 19, 24.29, 260.1, 261, 241/24.19
See application file for complete search history.

(56) References Cited

U.S. PATENT DOCUMENTS

| | | | | |
|---|---|---|---|---|
| 4,088,528 | A * | 5/1978 | Berger et al. | 162/19 |
| 4,488,932 | A * | 12/1984 | Eber et al. | 162/9 |
| 6,120,648 | A * | 9/2000 | Scott et al. | 162/261 |
| 6,379,594 | B1 * | 4/2002 | Dopfner et al. | 264/28 |
| 6,899,790 | B2 * | 5/2005 | Lee | 162/4 |
| 7,138,078 | B2 * | 11/2006 | Gotoh | 264/45.3 |
| 2002/0067730 | A1 * | 6/2002 | Hinderks et al. | 370/395.52 |
| 2009/0009913 | A1 * | 1/2009 | Komagaki | 360/319 |

FOREIGN PATENT DOCUMENTS

| | | | |
|---|---|---|---|
| EP | 0402 866 A2 | 12/1990 | |
| EP | 1469126 A1 | 10/2004 | |
| FR | 2417580 A1 * | 9/1979 | ............... D21B 1/30 |
| GB | 2066145 A | 7/1981 | |

* cited by examiner

*Primary Examiner* — Faye Francis
*Assistant Examiner* — Onekki Jolly
(74) *Attorney, Agent, or Firm* — Gable Gotwals

(57) ABSTRACT

The current invention is directed to a method and apparatus for defibrillating cellulose fibers achieved through single or multiple passes of raw or pre-processed cellulose fiber slurry with a preferred solid material consistency range of 35% to 55% through twin-screw fiber processing machines. During this processing operation fiber slurries are optionally further enhanced with additional fiber and mineral additives to optimize performance of the material for specific end purposes. The hyper defibrillated fiber slurry produced can be defined as one reaching a Schopper-Riegler (SR) level between 75 SR and 85 SR and/or producing a pressed, dried board with a density of preferably at least 850 kg/m$^3$.

14 Claims, 2 Drawing Sheets

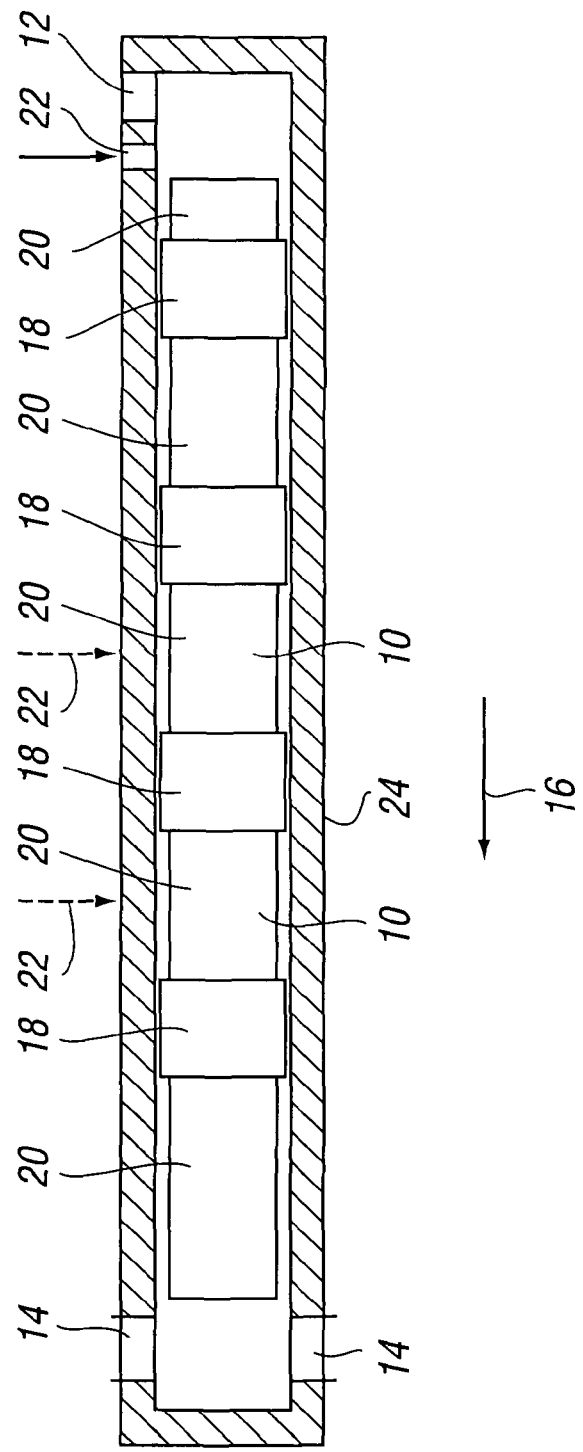

METHOD AND APPARATUS FOR DEFIBRILLATING CELLULOSE FIBERS

CROSS-REFERENCE TO RELATED APPLICATIONS

This application is the United States National Phase of PCT Patent Application No. EP2010/058927 filed on 23 Jun. 2010, which claims priority to PCT Application No. NL2009/000141 filed 24 Jun. 2009, both of which are incorporated herein by reference.

BACKGROUND OF THE INVENTION

The current invention relates to a method and apparatus for defibrillating cellulose fibres. The defibrillation is achieved through single and multiple passes of a raw or pre-processed cellulose fibre slurry, with a preferred solid material consistency range of 35% to 55%, through twin-screw fibre processing machines. During this processing operation, fibre slurries are optionally further enhanced with additional fibre and mineral additives to optimise performance of the material for specific end purposes.

The hyper defibrillated fibre slurry produced is defined as one reaching a Schopper-Riegler (SR) level of between 67° SR and 88° SR and/or producing a pressed, dried board with a density of preferably at least 850 kg/m$^3$. Compared to traditional defibrillating methods, like single disc, multi-disc or conical refiners, advantages of the invention are significant energy and time savings, higher comparable output, and a very wide dry fibre consistency range of between 10% and 80%.

As used in this application, the term 'consistency' is a paper making term and refers to the amount of dry fibre in water suspension expressed as a percentage.

The current invention relates to a new method for the treatment of compositions comprising cellulose fibres into compositions comprising cellulose microfibers. The composition comprising cellulose microfibers obtained by the method according to the invention can now suitably and economically be used in producing, for example, 3-dimensional objects, wall and floor boards, wall and floor tiles and which have a high density of at least 850 kg/m$^3$, with a preferred minimum of 1200 kg/m$^3$.

Processes for opening, beating or defibrillating pulp to obtain fibrillation, increased surface area, increased accessibility and fine particle size have long been known. Ball mills are used for preparing cellulose of several tens of microns in dimension. Studies have indicated that such ball milling breaks the chemical bonds of the cellulose during the dividing process.

It is also known to grind cellulose in water under pressure to produce a micro-cellulose with a particle size of less than one micron. In the case of cellulose derivatives, cold milling of the derivatives in liquid nitrogen is also disclosed in the prior art. Sonic pulverization with a ball mill is also a known method of producing cellulose in extremely fine particle size.

Finely divided celluloses are also produced in the traditional processes used in manufacturing mechanical pulps, fibreboard and paper pulp. Normally, however, these traditional processes involve the use of additional chemical treatment to cellulose pulps, such as for example, acid hydrolysis, which chemically alter or degrade the prepared cellulose pulps.

In the paper industry, it is known that paper strengths are directly related to the amount of beating or refining which the fibres receive prior to formation. However, beating and refining as practiced in the paper industry are relatively inefficient processes and large amounts of energy are expended to gain relatively minor amounts of fibre opening and fibrillation.

GB2066145 describes a process for preparing micro-fibrillated cellulose, comprising passing a liquid suspension of fibrous cellulose through an orifice in which the suspension is subjected to a pressure drop of at least 3000 psi and a high velocity shearing, followed by a high velocity decelerating impact and repeating the passage of said suspension through the orifice until the cellulose becomes a substantially stable suspension. The process converts the cellulose into micro-fibrillated cellulose without substantial chemical change. A particularly suitable device for carrying out the process is a high pressure homogenizer. The liquid suspension comprising fibrous cellulose preferably contains no more than 10% by weight of cellulose.

EP0402866 describes micro-fibrillated material comprising fibres having a variety of thicknesses, having a Schopper-Riegler of 40° SR or greater, having a T valve of 15 or greater when the fibres are formed in a filter sheet. The materials are obtained using a high-pressure homogenizer. For example, it is described that using refined linter (Vackai HVE) as a raw material, a 2% suspension of cellulose in water is obtained by pre-treatment so that it can pass through the nozzle of the apparatus. The suspension is charged into a high-pressure homogenizer (Gaulin 15M-8TA) at ordinary temperature, and treated at a pressure of 500 kg/cm$^2$ G for four times. The result and suspension of micro-fibrous material is diluted to a concentration of 0.2%.

U.S. Pat. No. 6,379,594 describes a process for producing a work piece, comprising providing raw cellulose-containing and fibrous material; adding water to the raw material; finely chopping the raw material in a machine by continuously grinding the raw material with a total energy expenditure of at least 0.5 kWh/kg, based on dry weight of the raw material, into a microfiber pulp having an increased internal fibre surface and an increased degree of interlinking; forming the microfiber pulp to provide a shaped body; and drying the body by removing water therefrom to harden and form a work piece, without admixture of bonding agents to the microfiber pulp and without use of external pressure. In this way, a moldable microfiber pulp with very diverse fibre lengths and fibril sizes develops, which pulp has the characteristic of hardening to form a subsequently deformable fibre material with high density (up to a specific gravity of 1.5) and strength without the admixture of adhesives or chemical additives and without the use of pressure, through drying and the associated shrinkage. The examples disclose that the cellulose-containing materials used in the method are taken up in watery solutions with a dry substance between 5 and 8% by weight.

However, the above processes have only a limited application as the material obtained has the disadvantage of requiring too high an energy input to be economically feasible (see the Examples) for use of such materials in forming, for example, 3-dimensional objects, wall and floor boards, wall and floor tiles, and, in general, for larger surfaces.

The difference between pulping and defibrillation should also be appreciated. In pulping, lignin is removed from lignocellulosic materials to render the fibres suitable for paper and board making. In defibrillation the purpose is to raise a nap of individual fibrils making up the outer surface or wall of the fibre whilst, at the same time, attempting to maintain both the condition of the interior of the fibre and the fibre length.

It is therefore an object of the current invention to provide a more economically and environmentally friendly method and apparatus for providing compositions comprising cellulose microfibers, for example, comparable to those described in U.S. Pat. No. 6,379,594.

It has been found by the current inventors that the above mentioned problems(s) are solved by the method, compositions, apparatus and use according to the current invention.

BRIEF SUMMARY OF THE INVENTION

The invention relates to processes and technology for the manufacture of defibrillated cellulose fibres, which can be used directly as a basis for further forming processes, can become a component in hybrid materials, can be extruded as semi-finished or finished product, can be coated on to a wide range of cellulose-based substrates and/or dried in granular form for further processing. Therefore, typical industry end uses include; paper manufacturing, flexible membranes, building and interior board products, automotive industry, furniture, lighting, durable consumer goods casings, disposable consumer goods casing and packaging. These materials can also be recycled into different new products or reused as a component of the original product.

Some of the advantages of the invention concern reduced energy requirement (see example) in comparison to those methods known to the applicant (see Examples), a wide variety of options for the raw materials that can be used in the method according to the invention, and reduced processing time.

In more detail, the current invention relates to a method for defibrillating cellulose fibres, achieved through single or multiple passes of a raw or pre-processed cellulose fibre slurry, with a preferred solid material consistency range of 35 to 55%, through twin-screw fibre processing machines. During this processing operation, fibre slurries are optionally further enhanced with additional fibre and mineral additives to optimise performance of the material for specific end purposes. The hyper defibrillated fibre slurry produced is defined as one reaching a Schopper-Riegler level of between 75° SR and 88° SR and/or producing a pressed, dried board with a density of preferably at least 850 kg/m$^3$, preferably at least 1200 kg/m$^3$. Compared to traditional defibrillating methods, like single disc, multi-disc or conical refiners, the advantages of the process according to the invention are significant energy and time savings, higher comparable output, and a consistency range of between 10% and 80%.

In a first aspect, there is provided a method for the treatment of a composition comprising cellulose fibres into a composition comprising cellulose microfibers characterized in that the method comprises the steps of
  a) providing a composition comprising cellulose fibres;
  b) Admixing aqueous solution/solvent to said composition comprising cellulose fibres to provide a pulp suspension comprising cellulose fibres;
  c) Feeding said pulp suspension comprising cellulose fibres into a refining step comprising a mechanical defibrillation process executed using a refining twin screw;
  d) Refining said pulp suspension comprising cellulose fibres with at least the use of said refining twin screw, to provide a composition comprising cellulose microfibers.

In one embodiment the obtained composition comprising cellulose microfibers at the end of the refining step, has a density of at least 850 kg/m$^3$. Preferably the density value is determined according to the method described in Example 1.

Refining or beating, is the mechanical action which causes de-fibrillation. This treatment of the said pulp suspension comprising cellulose fibres by said refining twin screw (with energy consumptions such as those shown in the examples) provides a composition comprising cellulose microfibers; and the obtained composition comprising cellulose microfibers at the end of the refining step has a density of at least 850 kg/m, preferably as measured according to the method described in Example 1. As will be described in detail below, it has thus been established that the method according to the invention allows the provision of suitable material with densities, and/or Schopper-Riegler values, with lower energy input/energy costs in comparison to those methods described in the prior art.

Within the context of the current invention "materials comprising cellulose fibres" comprise any suitable material, for example, and are not necessarily limited to paper, recycled paper, and lignocellulosic fibre sources including, but not confined to, retted and green raw hemp, flax, cereal straws, wheat, barley, rye, oats, rice, pomace, spent grain, and/or used cotton. As will be understood by the skilled person, the presence of fibres and associated fibrils are part of any suitable material.

Any (ligno)-cellulosic material may be processed with the technique described. Preferably the materials comprising cellulose fibres comprise at least 60% by weight cellulose. Lignin appears not necessary to achieve microfiber pulp having an increased internal fibre surface and an increased degree of interlinking via twin screw technology, nor does it interfere with the twin screw refining process.

It will be understood by the skilled person that such materials may be pre-treated before being applied in the method according to the invention. Such pre-treatment may include removal of toxic or unwanted materials, chopping, hammer milling or pinning of the material, washing, and chemical treatments, either singly or combinations thereof.

For example, pre-treatment may comprise the use of a paper shredder with an interchangeable hammer mill suitable for preparing hemp, cereal straws and other ligno-cellulosic materials, linked to extraneous (contrary) material separation (wood, metal, stones, plastic, etc) and a cleaning system, including dust removal.

In a next step of the method, the composition comprising cellulose fibres is (and preferably while being subjected to the coarse grinding) mixed with an aqueous solution/solvent, such as tap water or deionised water. Said mixing can for example, be performed by dry feeding the composition comprising cellulose fibres into a twin screw machine. In one embodiment the treatment of the material as it passes along the twin screw machine is varied at different stages. In one embodiment the stages include the kneading of the material and another stage is provided to restrict the flow of the material.

As will be understood by the skilled person, if required, the aqueous solution/solvent may comprise additional materials, for example additives such as described below (but not limited to): Wetting agents to accelerate water penetration into the raw material, and/or dilute acids or alkalis to soften the raw material and/or Methyl or ethyl alcohols (methanol or ethanol) to soften the raw material.

The mixing with the aqueous solution/solvent/liquid may be performed by any means known to the skilled person, however preferably, preparing the pulp is achieved by feeding the composition comprising cellulose fibres to a first twin screw that is fitted with a water (or steam) feed system, preferably a meter feed system. In the twin screw the liquid and the composition comprising cellulose fibres are processed into a pulp. Preferably a counter rotating twin screw is applied in this step of the method to soften (lubricate) the fibres thereby minimising fibre damage.

In general, for the fibre micronising, treatment and pulping procedures a co-rotating twin screw fibre processing machine can be used at a speed of, for example, 250 RPM and in the range of 400-600 RPM and a set temperature of about 50°, but this temperature can be varied according to the fibres being treated, depending on the liquid addition rate and necessity. The consistency of the pulp can be varied from 10% to 80% solids content, which is advantageous in comparison to the methods described in the art, in which the use of much lower consistencies has been reported in a process to prepare cellulose microfibers within, for example, the pulp, paper and board making industries.

In a preferred embodiment of the method according to the invention, the pulp suspension provided in step b) is provided with a consistency of at least 30%; preferably the consistency is between, and including 35% and 80%, more preferably between, and including 35% and 75%, even more preferably between, and including 35% and 55%.

Within the context of the current application, consistency is defined as the amount of solids in an aqueous suspension of fibre, this aqueous suspension of fibre in water is commonly called "stock" in the pulp and paper industry.

It has surprisingly been found by providing a pulp suspension with a consistency of at least 30%, preferably the consistency is between, and including 35% and 80%, more preferably between, and including 35% and 55%, the method according to the invention can be performed in a highly economical fashion, reducing energy requirement in the production of the material.

In case of lower consistencies of the pulp suspension, energy demand of the method according to the invention increases, making the method in connection to this invention less attractive both economically and environmentally however it may still be useful for specialized technical applications.

It is noted that this is in strong contrast to the methods known in the art. For example, U.S. Pat. No. 6,379,594 describes the use of cellulose-coating materials in the method described therein, taken up in watery solutions with a dry substance between 5% and 8% by weight.

In a next step of the method according to the invention, the obtained pulp suspension comprising cellulose fibres is fed into a refining step comprising a mechanical defibrillation process executed using a refining twin screw and refining said pulp suspension comprising cellulose fibres with at least the use of said refining twin screw, to provide a composition comprising cellulose microfibers; and wherein said obtained composition cellulose microfibers at the end of the refining step, has a density of at least 850 kg/m³, preferably as determined accordingly to the method described in Example 1.

In one aspect of the invention there is provided a method of preparing cellulose fibres for subsequent use to form an article, said method including the steps of producing a pulp containing liquid and cellulose fibres and wherein, once the pulp is formed, introducing the pulp in a refining step into a twin screw conveyor to cause defibrillation of at least the outer fibrils of the cellulose fibres contained in the pulp Although the skilled person will understand that various twin screw configurations can suitably used in the method according to the invention, a twin screw configuration as described in the examples below can be used.

By operating the refining twin screw, the pulp suspension comprising the cellulose fibres is treated such that the obtained composition comprising cellulose microfibers is provided with the characteristic that it obtains a density of at least 850 kg/m³ (see examples), preferably measured according to the method described in detail in Example 1.

In a preferred embodiment, there is provided a method in accordance with the invention wherein the obtained composition comprising cellulose microfibers has a density of between, and including, 900 kg/m³ and 1450 kg/m³, more preferably between, and including, 1000 kg/m³ and 1450 kg/m³, even more preferably between, and including 1150 kg/m³ and 1400 kg/m³, most preferably between, and including, 1300 kg/m³ and 1400 kg/m³, preferably measured in accordance with the method described in detail in Example 1.

The material thus obtained can suitably be used in subsequent steps of the method according to the invention for the production of, but not limited to, 2- or 3-dimensional shaped bodies, including sheets or plates suitable for use as flooring, wall panels, ceiling tiles, packaging, printing and writing materials or substrates, furniture, moulded packaging, musical instruments, automotive interiors, decorative mouldings, and granulates and the like.

In another preferred embodiment the composition comprising cellulose microfibers has a Schopper-Riegler value (SR) of at least 60° SR, preferably of at least 70° SR, even more preferably of at least 80° SR. This Schopper-Riegler value can be measured with any known procedure. A standard that could be used is "BS EN ISO 5267-1 2001. Pulps and determination of drainability. Schopper-Riegler Method". Preferably, and recommended by the applicant, the Schopper-Riegler value is measured in accordance with the method described in detail in Example 2 (further below).

In another preferred embodiment, there is provided that the composition comprising cellulose microfibers has a Schopper-Riegler value (SR) of between, and including 75° SR and 90° SR, more preferably between, and including 75° SR and 88° SR. Again, this Schopper-Riegler value can be measured with any known procedure. A standard that could be used is "BS EN ISO 5267-1 2001. Pulps and determination of drainability. Schopper-Riegler Method". Preferably and recommended by the applicant, the Schopper-Riegler value is measured in accordance with the method described in detail in Example 2 (further below).

In other words after refining the pulp suspension comprising cellulose fibres by use of the refining twin screw to provide a composition comprising cellulose microfibers, the obtained material (before any drying) has a Schopper-Riegler value (SR), preferably as determined as described in the Example 1, of at least 60° SR, preferably of at least 70° SR, even more preferably of at least 80° SR, or has a Schopper-Riegler value (SR) of between, and including 75° SR and 90° SR, more preferably between, and including 75° SR and 88° SR.

In a particularly preferred embodiment, the composition of cellulose microfibers has, before any drying, a Schopper-Riegler value of about 86° SR, and a density of more than 1300 kg/m³, as described above. It has been found that in particular such material is very suitable for use in a variety of products including but not limited to 3-dimensional objects, wall and floor boards, wall and floor tiles. By the method according to the invention, it is now possible to provide for such material in a manner that is both economically and environmentally advantageous.

In a further embodiment, the composition comprising micro-fibres, with or without any additives (i.e. optionally after being passed through a mixing device for admixing the additives), can, before drying, be formed into a shaped body. It has been found that at this stage of the process, the obtained material can be, due to its plastic, flexible and deformable properties, formed into any required or desired shape, for example into sheets or plates, suitable for flooring, wall panels, ceiling tiles, packaging, printing and writing materials and substrates as well as a range of 3-dimensional objects including but not limited to furniture, moulded packaging, musical instruments, automotive interiors, decorative mouldings.

However, as an alternative to the above, the obtained materials can, after being air dried, be re-wetted in order to provide the advantageous plastic, flexible and deformable properties, allowing it to be easily formed into any desirable shaped body, including sheets or plates in the preferred range 0.1 mm-12 mm. As will be understood by the skilled person, the forming can be performed by any suitable method known to the skilled person.

In a further preferred embodiment according to the invention, the composition comprising cellulose microfibers, optionally after being passed through a processing device as described above, is air dried, preferably to a moisture content of 2% to 10% (by weight), preferably 5% to 7% (by weight), as measured using a Metler Toledo HG53-P Moisture Analyzer.

Air drying (or oven drying at 70-105° C.) to a moisture content of 2% to 10% (by weight) preferably to 5% to 7% (by weight) can be performed by any means known to the skilled person, for example. It is noted that the external pressures, temperatures and forces applied after the refining above all serve to effect a more rapid preliminary drainage, forming and holding of the form and do not represent a premise for achieving high materials strengths.

In another aspect of the invention there is provided a method according to the invention which includes the step of moulding a sheet from said composition comprising cellulose microfibers and attaching said sheet to a carrier to form a flooring tile. In addition there is provided for a composition comprising cellulose microfibers obtainable by a method according to the invention, and the use of such composition in a method for producing 2- or 3-dimensional shaped bodies, including sheets or plates, suitable for use as any or any combination of; flooring, wall panels, ceiling tiles, packaging, printing and writing materials, substrates, furniture, moulded packaging, musical instruments, automotive interiors, decorative mouldings and granulates.

In a further aspect of the invention there is provided apparatus for use in the defibrillation of cellulose fibres, said apparatus comprising a twin screw conveyor, an inlet at a first end for the introduction of the cellulose fibres and/or liquid in which said fibres are contained, an outlet at an opposing end via which the defibrillated fibres leave and characterised in that intermediate the inlet and outlet, there are provided on said twin screw conveyor at least one cluster of refining members and one means of flow restriction.

In one embodiment there are provided a plurality of refining clusters along the length of the conveyor, said clusters separated by flow restriction means. In one embodiment there can be provided clusters of flights which act to transport the material along the screw, said clusters typically being provided between the flow restriction means.

In one embodiment the elements of the twin screw conveyor at the refining clusters act as kneading elements to perform a kneading action on the fibres.

In one embodiment the means of flow restriction is a series of spiral screw elements formed on the twin screw conveyor which reduce the speed of flow of the material through the conveyor.

In one embodiment the screw elements of the conveyor are tri- or bi-lobal, but preferably tri-lobal in order to provide improved refining or defibrillating efficiency.

In one embodiment the fibres are fed into the apparatus inlet in a dry format and liquid is separately injected into the conveyer.

BRIEF DESCRIPTION OF THE DRAWINGS

Specific embodiments of the invention are now described in which;

FIG. 3 illustrates in schematic manner, a twin screw conveyor apparatus in accordance with the invention.

DETAILED DESCRIPTION OF THE INVENTION

Figure 1:
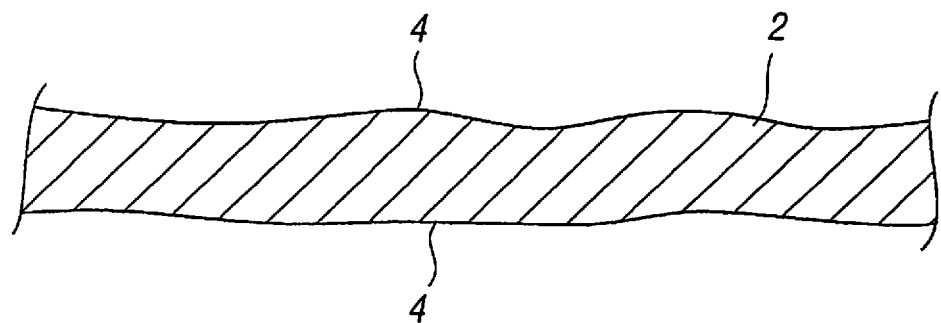
FIG. 1 illustrates a fibre prior to defibrillation in accordance with the invention.
Figure 2:
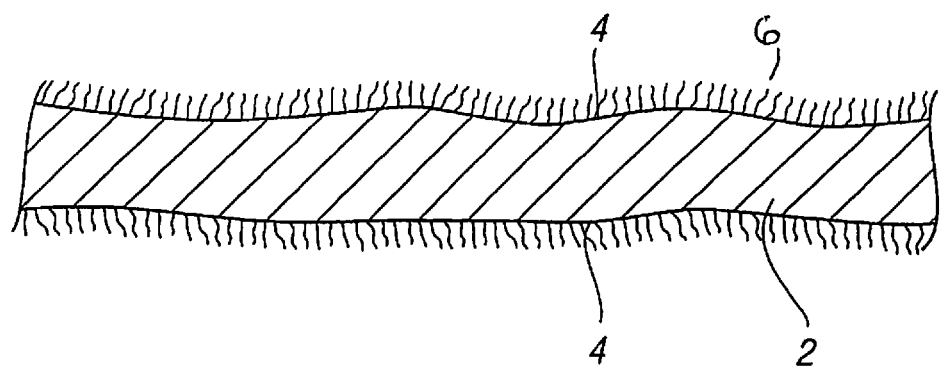
FIG. 2 illustrates a defibrillated fibre in accordance with the invention.

Referring firstly to FIGS. 1 and 2 there is illustrated a fibre 2 in cross section along the longitudinal axis, in FIG. 1 prior to defibrillation and it will be seen that the outer surface 4 of the same is relatively smooth and continuous. It should be noted that this fibre in this form may already have passed through a pulping process and can be provided in a "dry" form or alternatively be carried in a wet form in a liquid.

During the operation of the twin screw conveyor in accordance with the invention, the cellulose fibres, made up of layers of micro-fibres called fibrils 6, are refined in that the fibrils are partially de-fibrillated/unraveled from the parent fibre 2 at the outer surface thereof thus creating a greater number of potential bonding sites, thereby promoting hydrogen bonding between the fibres and/or fibrils. This action is known as de-fibrillation.

In certain embodiments, the refining twin screw is a co-rotating or counter rotating twin screw.

Indeed, in the accompanying examples, this is exemplified for various types of materials and with various consistencies of the pulp suspension. In addition, it has been found that by the use of a twin screw, materials of higher consistency than those reported in the art can advantageously be utilized, as described herein. Moreover, there is a significant reduction in processing time in comparison to, for example, the method described in U.S. Pat. No. 6,379,594 (from hours to minutes when expressed as the time for obtaining equal amounts of a composition comprising micro-fibres), as well as a reduction in energy consumption.

Turning now to FIG. 3 there is illustrated in a schematic manner a twin screw conveyor 10 adapted to provide effective refining and defibrillation of the fibres in accordance with the invention. The apparatus include an inlet 12 at one end of the conveyor and an outlet 14 at the opposing end which is downstream with respect to the flow of the fibres and liquid through the conveyor in direction of arrow 16. The screw conveyor is provided with a series of stages formed therein which provide differing treatments of the material.

Flow restriction means 18 are provided in the form, in this embodiment of left hand spiral screw elements, typically with gaps formed in them. The flow restriction means are provided downstream of a cluster of refining elements 20 as shown. The flow restriction means 18 serve to slow down the flow of the material through the screw conveyor and hence cause the material to back up and be located in the cluster of refining elements upstream for a longer period of time and, thus, cause greater refining and defibrillation to be achieved. The flow restriction means therefore achieve the modulation of the flow rate of the material through the upstream cluster of refining elements and hence allow the desired high refining to be achieved.

The clusters of refining elements provide relatively low energy refining whilst ensuring that the same is effective in achieving the defibrillation of the fibrils. Preferably a series of clusters 20 are located along the length of the twin screw conveyor as shown rather than a smaller number of longer clusters so as to minimise heat generation. Typically each of the clusters of refining elements comprise kneading elements that are formed to contact with the fibres and perform the refining operation. It is found that if said kneading cluster is too long in length along the conveyor the material can overheat and be dewatered and hence refine less efficiently in the following clusters of the screw. Preferably the longest possible refining cluster should be positioned at the end of the screw profile i.e. close to the outlet.

In one embodiment, further inlets 22 for liquid may be located along the length of the barrel 24 in which the twin screw conveyor is provided to allow any dewatering effect to be mitigated by the addition of the further liquid.

The liquid content of the material within the apparatus is controlled and ideally the solid content in the material within the conveyor should be within the range of 45% and 75% but it is possible to use a material with a solid content in the range of up to 90% for preparing the fibres for particular purposes such as preparing fibre for plastics.

With regard to the elements of the twin screw conveyor the same can be bi-lobal but are preferably tri-lobal. Tri-lobal elements show a higher refining efficiency as compared to the bi-lobal counterparts with the refining of defibrillation action on the fibres attributed to the "pinching" portion of the element revolution where material gets caught between the revolving lobes of the identical elements on the position along the shafts and between the tip of the kneading elements of the screw and the barrel wall. During a bi-lobal revolution "pinching" occurs two times per revolution whereas the use of a tri-lobal revolution causes the "pinching" to occur three times and, thus more refining is obtained per full revolution. Preferably the outer surface of the elements will be formed so as to optimise the refining action, such as, for example, by providing a roughened surface finish. The inner wall of the barrel in which the screw conveyor elements are located may also be provided with a surface finish to increase the refining action at the element-barrel interface.

In one embodiment the fibre material is introduced into the inlet in a substantially dry condition and liquid is introduced separately into the barrel. This allows a consistent refining to be achieved and allows for higher screw speeds to be used. If the solid content of the material can be modulated, then the refining level can also be controlled.

It will be appreciated by the skilled person that based on the teaching disclosed herein, he will be capable of determining the proper operational parameters for obtaining a composition comprising cellulose microfibers with the characteristic that it has a density of at least 850 kg/m$^3$, preferably measured in accordance with the method described in detail in Example 1, such as for example, in the circumstances that a source of cellulose fibres that is different from that used in the examples is used in the method according to the invention.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is limited only by the scope of the attached claims, including the full range of equivalency to which each element thereof is entitled.

EXAMPLE 1

Measurement of Density of Refined Pulp Stock (Developed by The Wolfson Centre for Materials Processing, Brunel University, Uxbridge, Middlesex, UB8 3PH)

An accepted measure of natural fibre refining consistency is the density profile of the compressed refined fibre. If the density profile of a pulp board with the desired strength characterised can be reproduced, then the strength characteristics will be maintained.

Method of Density Measurement

1. Take a sample of the processed pulp approximately equivalent to 3 g of dry matter and place into a beaker.
2. Add 50 ml of tap water to the pulp sample and then mix the pulp fibres in the beaker with a spatula to disperse the wet pulp fibres.
3. Take the suspension of step 2 and filter out part of the free water, using filter paper and a Buckner funnel or similar device. The use of the filtering system should increase the solid content of the resulting pulp to 10%-12%.
4. Place the pulp (from step 3) in a compression moulding tool (see FIG. 3) and pressurise up to 120 lb/in$^2$ (about 8.5 kg/cm$^2$). The compression moulding tool which can be manufactured from base polymer (or stainless steel metal to avoid rust formation) is composed of a cylindrical shaft (20) with a diameter (D–1)=20 mm and height (H–1)=12 mm. A measured quantity of pulp (from step 3) is placed in the cylinder bore (24)—diameter (D–2)=20.2 mm
and height (H–2)=12 mm of the bottom half (21) of cold mould which is mounted in a press. A very fine sieve (22) is placed at the bottom of the bottom half (21) of the mould to allow water to escape during compression. The mould is then closed, bringing the bottom half (21) of the mould against the top half (23) under pressure. As the mould halves (21, 23) come together under pressure, the pulp begins to dewater (or release water). The paper pulp fibres used have high water retention properties therefore pressure is applied slowly and gradually until the specific pressure (about 8.5 kg/cm$^2$) is achieved. Maintain pressure for 15 mins. During this gradual pressing process, water in the pulp is drawn through the mesh, leaving behind consolidated pulps in the shape of tablets similar to the shape of the mould.
5. Care should be taken during compression moulding to avoid pulp escaping with water from the bottom of the mould.
6. After compression moulding the moulded disc is removed from the mould, usually by using a correspondingly shaped transfer tool, and dried by placing it (the moulded disc) into an air circulating oven at 105° C. until dry, i.e. until constant weight is achieved. Dry status is checked with a Metler Toledo HG53-P Moisture Analyzer.
7. Three specimens are produced for each test sample.
8. The density (d) of a dried moulded disc is calculated using the following method: i) precisely measure the volume of the dried moulded disc using a gas picnometer (or Picnometer), ii) measure the weight of the dried moulded disc using a precision weighing balance, iii)

calculate the density of the dried moulded disc using the following formula:

Density=mass(weight)/volume

EXAMPLE 2

Measurement of Schopper-Riegler on Pulp Stock (Developed and Used by Cross and Bevan Laboratories Limited, Edgworth House, High Street, Arlesey, SG15 6SX)

Although the Schopper-Riegler values can, according to the invention, be measured with any Schopper-Riegler measurement procedure, such as the procedure according to the standard "BS EN ISO 5267-1 2001. Pulps and determination of drainability. Schopper-Riegler Method". (in short "BS EN ISO 5267-1 2001") the applicant suggests and recommends the procedure below-developed by Cross and Bevan Laboratories Limited-as it better suits the materials produced according to the invention.

The main difference between the procedure according to standard "BS EN ISO 5267-1 2001" and the procedure recommended by applicant, is that in the procedure according to standard "BS EN ISO 5267-1 2001" there is used de-ionized water, whilst in the procedure recommended by the applicant there is used tap water. Although for the outcome not very essential, this tap water might have a PH around 6.5 and a hardness of about 200 ml/mg.

The procedure describes how the Schopper-Riegler (SR) test is performed on pulp stock suspension. For this test procedure, the pulp stock suspension is achieved by adding a specific amount of tap water to the refined material coming out of the co-rotating twin screw extruder. The details of the preparation of the pulp stock suspension are described in the test method section of this Example 2 (see especially steps 2-5 of the section "test method" of this Example 2). The test measures the rate of water drainage from the pulp fibres under standard conditions. This provides an indication of the degree of fibrillation (fraying) and hydration (water absorption) of the fibres. More beaten pulp suspensions are more fibrillated and hydrated, the water drains more slowly; and the SR value is higher.

Apparatus
1. A standard Schopper-Riegler test apparatus (10) with 2 measuring cylinders (11, 12) of 1000 ml, which are shown schematically in FIG. 4.
2. Mercury in glass thermometer.

The above mentioned measuring cylinders (11, 12) are 1 liter measuring cylinders with one scale (13) indicating both volume and SR value. The volume scale is from 0 ml to 1000 ml values increasing from bottom to top. The SR scale is marked from 100° SR to 0° SR decreasing from bottom to top of the cylinder. For example, 10 ml equates to 99° SR and 1° SR equates to 990 ml.

Check Procedure for SR Apparatus

The SR apparatus must be checked daily before use by the following steps:
1. Place the 2 measuring cylinders under the orifices of the SR tester.
2. Rinse the apparatus with water at 20° C. Ensure that the cylinder body (14) is correctly positioned. Lower the sealing cone (15). Pour 1 liter of tap water into the body (14) of the SR test apparatus (10). If water leaks from the apparatus the position of the sealing cone (15) requires adjusting. Discard the water, adjust the sealing cone (15) and re-test.
3. Press the release lever and wait for all the water to drain.
4. Check the SR number corresponding to the volume of water collected in the cylinder from the front orifice (18). This should be 4.
5. If the SR value of the water is greater than 4, clean the wire mesh (16) in the body (14) thoroughly, check the temperature and the water used to re-test. The wire mesh (16) may be cleaned using acetone and a soft brush, followed by thorough rinsing.

The wire mesh is a wire mesh as defined in standard "BS EN ISO 5267-1 2001".

Test Method
1. Calculate the exact solid content of the co-rotating twin screw refined stock via Metler Toledo HG53-P Moisture Analyzer or any other recognised standard method for moisture determination.
2. Take the equivalent of 2 dry grams of twin screw refined stock, add to 500 ml of tap water, stir with magnetic stirrer and sonicate with the aid of a standard sonicater (or disintegrate—with the aid of a standard pulp disintegrator) until complete fibre dispersion has been achieved.
3. Check the temperature of the water and pulp suspension, and adjust to 20±0.5° C. if necessary, before carrying out this test.
4. Position the two measuring cylinders (11, 12) as described above, see FIG. 4. Ensure that the cylinder body (14) is correctly positioned and lower the sealing cone (15)
4. Ensure that the stock solution is thoroughly mixed and then measure the volume calculated in step 2. Dilute to 1000 ml with water at 20° C.
5. Mix the pulp stock—from step 5—thoroughly and pour rapidly and smoothly into the cylindrical body (14). Pour the stock against the shaft (17) of the sealing cone (15) to avoid a vortex.
6. Raise the sealing cone (15) 5 seconds after all the stock—from step 5—has been poured into the body (14).
7. When the water has finished draining, record the SR value equivalent to the volume of water collected from the front orifice (18).
8. Remove the body (14) of the SR, and wash all fibres from the wire mesh (16). Empty and replace the cylinders (11, 12).
9. Repeat the test (steps 1 to 9) with a second portion of stock.
10. If the two SR readings differ by more than 4% (1 unit for SR value of 25° SR), repeat the measurement—steps 1-9 using another portion of pulp. The two closest values are then used.

Calculation

Calculate the mean of the two readings. Report the SR value to the nearest whole number.

EXAMPLE 3

Twin Screw Configuration

The method according to the invention has been performed with a co-rotating intermeshing twin screw as the twin screw refining system. In this example, the barrel internal diameter was 24 mm, the screw outer diameter (OD) was 23.6 mm, the screw internal diameter (ID) was 13.3 mm, the distance between the centre lines of the screws was 18.75 mm, the pitch is positive with respect to rotation—although negative elements can be used—and the screw design was of a bi-lobal type. The configuration of this twin screw is given in Table 1 below. The Table 1 gives the number and type of screw elements of each screw in successive order from the inlet side—upper side of the table—to the outlet side—lower side of table—of the screw. From this table it follows that the total L/D ratio of the screw is 40:1 and that the diameter of each screw element is 23.6 mm and the diameter of the barrel is 24 mm.

TABLE 1

Configuration of twin screw refining system

| Number of Elements | Type | L/D (length/ diameter ratio) | Cumulative Total Length |
|---|---|---|---|
| 6 | 1DFS | 6 | 6 |
| 2 | 60F | 0.5 | 6.5 |
| 1 | D/2 60F | 0.5 | 7 |
| 1 | D/2 30F | 0.5 | 7.5 |
| 2 | D/2 90A | 1 | 8.5 |
| 6 | 1 D FS | 6 | 14.5 |
| 1 | D/2 30F | 0.5 | 15 |
| 7 | 30F | 1.75 | 16.75 |
| 7 | D/2 60F | 3.5 | 20.25 |
| 9 | 1 D FS | 9 | 29.25 |
| 2 | 30 F | 0.5 | 29.75 |
| 1 | D/2 30F | 0.5 | 30.25 |
| 6 | 30F | 1.5 | 31.75 |
| 6 | 90A | 1.5 | 33.25 |
| 5 | 1 D FS | 5 | 38.25 |
| 1 | Alpha Beta D/4 | 0.25 | 38.5 |
| 1 | 1.5 EXT | 1.5 | 40 |

Concerning the nomenclature used for the type indications in Table 1 above:

D stands for Diameter; FS stands for Feed Screw; F stands for Forwarding; A stands for Alternating; Alpha-Beta is transition element between the bi-lobal elements and the final pressure generating uni-lobal discharge screw; EXT stands for Extrusion screw; D/2 stands for half the Diameter, D/4 stands for quarter of Diameter: the numbers 1 and 1.5 in the "type" column of table 1 are overall L/D ratios of the elements; and the numbers 30, 60 and 90 in the type column of table 1 are the angle in degrees between consecutive mixing elements. It should be also noted that the twin screw conveyor used can have the same or different combination of refining clusters and flow restrictors as illustrated in FIG. 3, to suit specific dimensions and material requirements.

EXAMPLE 4

Energy Usage to Refine Cellulose-Containing and Fibrous Material to Microfiber Pulp Having an Increased Internal Fibre Surface and an Increased Degree of Interlinking The tables below show energy usage to refine cellulose-containing and fibrous material to a microfiber pulp having an increased internal fibre surface and an increased degree of interlinking, and having properties as described in the above detailed description.

Table 2 shows the energy usage, in kWh per kg of product, at the end of the refining process to refine cellulose-containing and fibrous material to microfiber pulp having an increased internal fibre surface and an increased degree of interlinking, via a standard Voith double disk refiner technology (the "traditional" technology). The data of Table 2 was collected by Voith paper GmbH, Escher-Wyss-Str. 25, Ravensburg, Germany.

TABLE 2

Energy usage of Voith double disk refiner

| Type of fibrous material | Energy usage kWh/kg |
|---|---|
| Recycled White paper | 1.539 kWh/kg (0.520 kWh/kg |
| Bleached Hemp paper (Celesa) | 1.628 kWh/kg (0.782 kWh/kg |
| Hard wood Kraft pulp(*Eucalyptus*) | 1.569 kWh/kg (0.700 kWh/kg |

NOTE:
All the values shown represent the GROSS Specific Refining energy. The NET energy values for the double disk refiner is shown between brackets ( ).

Table 3 shows energy usage to refine cellulose-containing and fibrous material to microfiber pulp having an increased internal fibre surface and an increased degree of interlinking via twin screw technology.

TABLE 3

Energy usage of twin screw technology according to invention

| Type of fibrous material | Energy Usage kWh/kg Twin Screw Refiner | Energy usage kWh/kg Voith double disk refiner (of Table 1) |
|---|---|---|
| Recycled best white paper | 0.218 | 1.539 kWh/kg (0.520 kWh/kg) |
| Mixed coloured waste paper | 0.218 | N/A |
| Soft Wood Kraft Pulp | 0.236 | N/A |

NOTE:
All the values shown represent the GROSS Specific Refining energy.
Difference between NET and GROSS specific refining energy has shown to be considerably larger for the disk refiner than for the twin screw refiner where such difference is negligible. The NET energy values for the double disk refiner is shown in brackets ( ).

As can be witnessed from the above tables 2 and 3, it has now become possible, in comparison to the methods in the prior art, to refine cellulose-containing and fibrous material to microfiber pulp having an increased internal fibre surface and an increased degree of interlinking and having properties as described in the above detailed description, with a considerably reduced energy usage and requirement. This allows for a more economically feasible and continuous production of such materials according to the invention.

EXAMPLE 5

Preparing Micro-Fiber Compositions According to the Invention

Here follows, as an example, a step by step description as to how 1 kg of white recycled paper is refined to restored refining levels using a co-rotating twin screw apparatus; in accordance with the invention;
1. 1 kg of R12 (best white paper) is mixed with an aqueous solution (i.e. tap water, having in the example a PH of 6, 5, and a hardness of 200 ml/mg) to a consistency of 45%. The mixing with the aqueous solution/liquid may be performed by any means known to the skilled person. However preferably, preparing the pulp is achieved by feeding the composition comprising cellulose fibres to a first twin screw that is fitted with a water (or steam) feed system, preferably a metered water feed system. In the twin screw the liquid and the composition comprising cellulose fibres are processed into a pulp. Preferably a counter rotating twin screw is applied in this step of the method to soften (lubricate) the fibres thereby minimising fibre damage.
2. The mixed material is manually introduced in the co-rotating twin screw (the characteristics and layout of which has been described in Example 3) at a feed rate of 3 kgh/hour. The co-rotating twin screw operates at a rotational speed of 250 rpm and at a fixed temperature of 50° C.

3. The material is "passed" one time through the co-rotating twin screw refiner and is collected and fed through a second time.
4. The material is "passed" a second time through the co-rotating twin screw refiner and is collected and fed through a third and final time. Following three "passes" the material has reached the desired refining level.
5. The ideal refining level of the co-rotating twin screw refined material is tested via the Schopper-Riegler (SR) technique. By following the experimental procedure described in Example 2, it is found that the SR value is about 82° SR-83° SR.
6. The density of the material from the co-rotating twin screw device is measured following the experimental procedure described in Example 1. The density value is found to be about 1270 kg/m³.

The below micro-fibre composition were produced following the procedure above, i.e. in a method comprising the method according to the invention. Results obtained are shown in Table 4. Note that although the procedure above for example 5 has been described with respect to 1 kg of R12 (best white paper) and up to three passes, in the below table 4, results are shown for 'white waste paper', 'mixed coloured paper' and 'soft Kraft wood pulp' and with up to 5 passes for 'white waste paper'. For the rest the procedure was the same as described above for example 5.

TABLE 4

Details regarding examples of twin screw refined material, obtained as described above.

| Fibre Type | Solid Consistency (%) | Pass # | SR Value (° SR) | Density (kgm⁻³) |
|---|---|---|---|---|
| White waste paper | 45% | 1 | 73 | 921 |
| White waste paper | 45% | 2 | 81.5 | 1230 |
| White waste paper | 45% | 3 | 82.5 | 1270 |
| White waste paper | 45% | 4 | 69.5 | 1340 |
| White waste paper | 45% | 5 | 56 | 1330 |
| Mixed Coloured Paper | 45% | 1 | 65 | 1170 |
| Mixed Coloured Paper | 45% | 2 | 71.5 | 1260 |
| Mixed Coloured Paper | 45% | 3 | 76 | 1370 |
| Mixed Coloured Paper | 45% | 4 | 74 | 1420 |
| Mixed Coloured Paper | 45% | 5 | 72 | 1450 |
| Soft Wood Kraft Pulp | 45% | 1 | 72 | 1110 |
| Soft Wood Kraft Pulp | 45% | 2 | 78 | 1130 |
| Soft Wood Kraft Pulp | 45% | 3 | 72 | 1230 |
| Apple Pomace | 25% | 1 | 61 | N/A |
| Apple Pomace | 25% | 2 | 65 | N/A |
| Apple Pomace | 25% | 3 | 69 | N/A |

The invention claimed is:

1. Method for the treatment of a composition comprising cellulose fibres into a composition comprising cellulose microfibers, said method comprises the steps of:
   a) Providing a composition comprising fibres;
   b) Admixing aqueous solution/solvent to said composition comprising cellulose fibres to provide a pulp suspension comprising cellulose fibres;
   c) Feeding said pulp suspension comprising cellulose fibres into a mechanical defibrillation process using a refining twin screw;
   d) Refining said pulp suspension comprising cellulose fibres with at least the use of said refining twin screw, to provide a composition comprising cellulose microfibers,
   e) wherein in step b) the pulp suspension has a consistency of between 45% and 55%, and the composition comprising cellulose microfibers has a Schopper-Riegler value (SR) upon leaving the twin screw of step c) of at least 80° SR.

2. The method according to claim 1 wherein said composition comprising cellulose microfibers at the end of the refining step has a density of at least 850 kg/m³.

3. The method according to claim 1 wherein said composition comprising cellulose microfibers has a density of between, and including, 1000 kg/m³ and 1450 kg/m³.

4. The method according to claim 1 wherein the composition comprising cellulose microfibers has a Schopper-Riegler value (SR) before any drying and upon leaving the twin-screw of the process, of between and including 80° SR and 90° SR.

5. The method according to claim 1 wherein the composition comprising cellulose fibres of step a) is selected from the group consisting of paper, waste paper, and recycled paper.

6. The method according to claim 1, comprising a further step of adding one or more further additives after the refining step.

7. The method according to claim 6, wherein the further additives are selected from the group comprising mineral and organic fillers, flow modifiers, sizing agents, dyes, coloured pigments and mordents.

8. Method according to claim 1, wherein the refining twin screw is a co-rotating twin screw or a counter-rotating twin screw.

9. Method according to claim 1, further comprising the step of moulding a 2- or 3-dimensional shaped body from said composition comprising cellulose microfiber stock.

10. Method according to claim 1 further comprising the step of moulding of a sheet from said composition comprising cellulose microfibers and attaching said sheet to a carrier to form a flooring tile.

11. A method according to claim 1 wherein the fibres are introduced dry and inlets are provided to introduce liquid to be combined with the fibres.

12. The method according to claim 1 wherein said composition comprising cellulose microfibers has a density of between, and including, 1150 kg/m³ and 1400 kg/m³.

13. The method according to claim 1 wherein said composition comprising cellulose microfibers has a density of between, and including, 1300 kg/m$^3$ and 1400 kg/m$^3$.

14. The method according to claim 1 wherein the composition comprising cellulose microfibers has a Schopper-Riegler value (SR) before any drying and upon leaving the twin-screw of the process, of between and including 80° SR and 88° SR.

* * * * *